Feb. 14, 1967  C. C. HANSEN  3,303,664
REFRIGERATION SYSTEM HAVING A BACK PRESSURE VALVE
Filed April 30, 1965  2 Sheets-Sheet 1
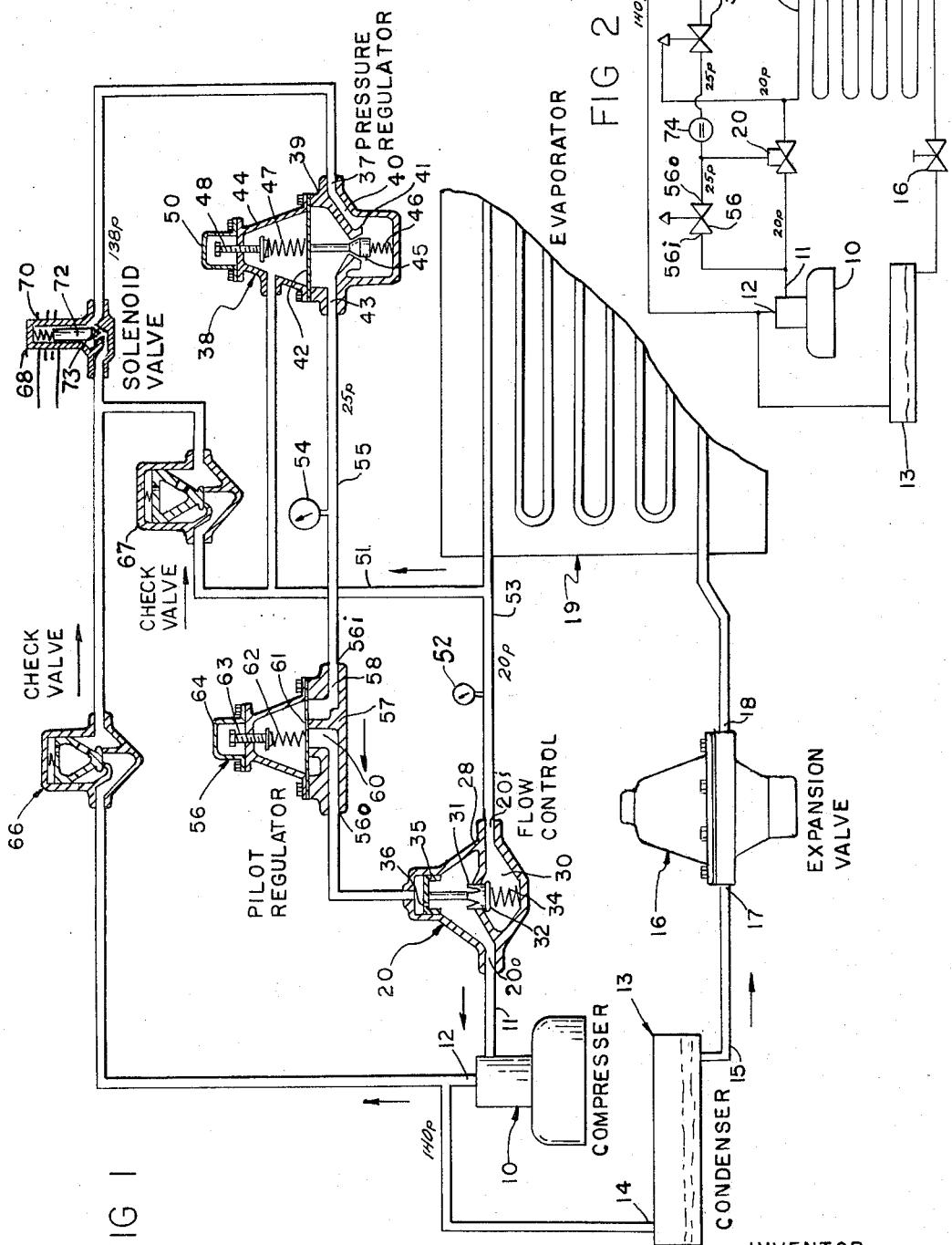
INVENTOR
CHARLES C. HANSEN
BY
ATT'Y Feb. 14, 1967          C. C. HANSEN          3,303,664
REFRIGERATION SYSTEM HAVING A BACK PRESSURE VALVE
Filed April 30, 1965          2 Sheets-Sheet 2
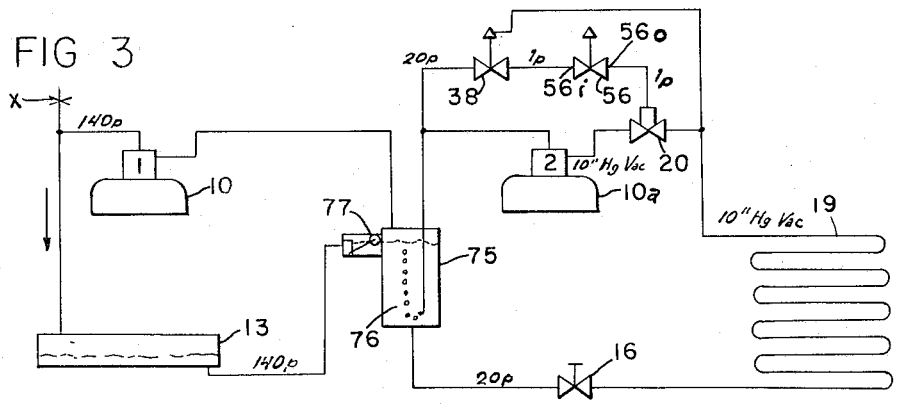
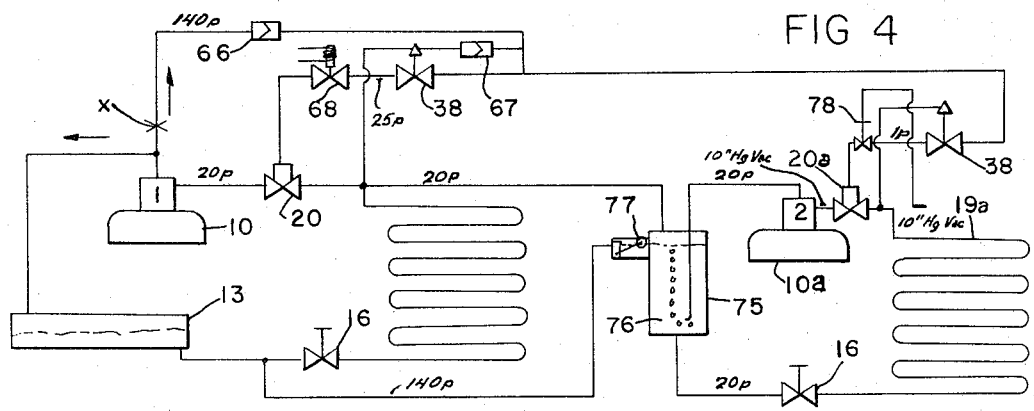
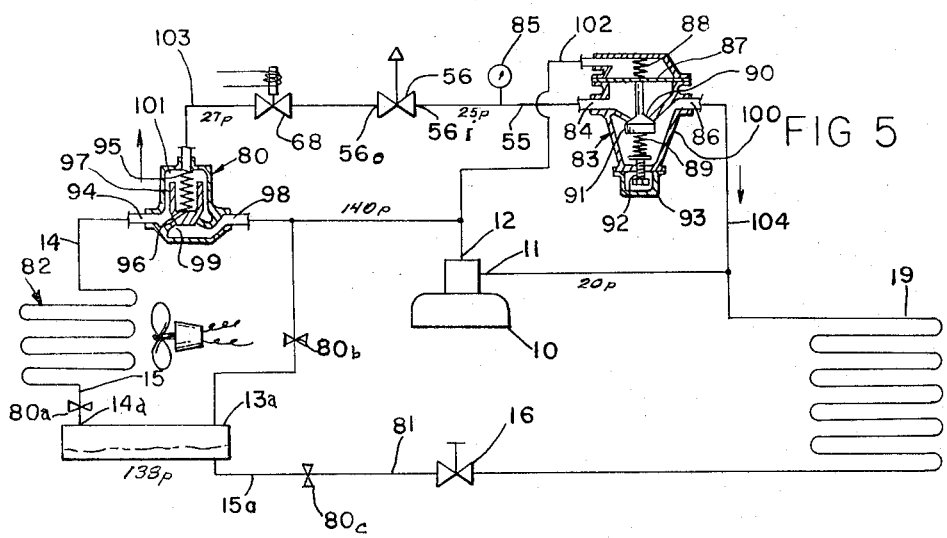
INVENTOR
CHARLES C. HANSEN
BY
ATT'Y

United States Patent Office 3,303,664
Patented Feb. 14, 1967

3,303,664
REFRIGERATION SYSTEM HAVING A BACK
PRESSURE VALVE
Charles C. Hansen, Hinsdale, Ill., assignor to Refrigerating Specialties Company, Broadview, Ill., a corporation of Illinois
Filed Apr. 30, 1965, Ser. No. 452,142
12 Claims. (Cl. 62—217)

The present invention relates to a refrigeration control apparatus and more particularly to the regulation of the flow of a refrigerant in any low pressure line of a refrigeration system with great reliability in that the regulation control is also made positive and effective at pressures less than two pounds per square inch pressure differential across the refrigerant flow control regulator in the line.

A compressor refrigeration system operates with high and low pressures, i.e., a high pressure on the vapor at the compressor output, which output condenses when cooled, and a low vapor pressure at the compressor intake. Both pressures can vary with intermittent operation of the compressor and with identical systems vary widely in different installations. An expansion valve retains the high pressure on the refrigerant that is favorable to its liquification and provides a low pressure in the evaporator for heat absorption with evaporation in the evaporator located in the work area.

The flow of refrigerant can be controlled or regulated in relation to the work load in a number of ways in connection with a regulator located beyond the outlet of the evaporator. The regulating function may be directed conventionally to control the outlet pressure of the regulator, or the inlet pressure of the regulator, or to maintain a constant pressure differential across the regulator, or in relation to some working temperature by a thermal bulb operated pilot valve that controls it, or operate the regulator for full open or closed flow in relation to a piloting solenoid valve.

Two designs have been commonly used for regulators of this type. One involves direct operation wherein an element such as a metal diaphragm or a bellows is directly linked to the regulator seat, disc assembly. This design is usually limited to regulators of one inch port size or smaller because of size and strength limitations of diaphragms and bellows. In addition, the direct operated design requires a substantial pressure change for the regulator seat disc to move from closed to wide open position; this may involve 5 to 10 pounds per square inch variation in control pressure, which is not fine enough for important applications.

The other design is pilot operated, wherein a small pilot pressure regulator is normally utilized to convey pressure from upstream of a main regulator, to throttle this pressure, and to send a reduced pressure to a piston or diaphragm in the main regulator, resulting in opening and closing of the main regulator seat disc, which is linked to the operating piston diaphragm. Since a very slight opening of the pilot regulator conveys sufficient fluid to operate the main regulator, the pilot operated design operates within a much narrower band than the 5 to 10 p.s.i. (pounds per square inch) required by the direct operated design.

One limitation of this latter design is that at least two pounds per square inch pressure difference and generally much more is required across the main regulator in order to fully open the main seat disc even when the pilot regulator or pilot solenoid valve is wide open. This requirement is caused by the need to use a fairly stiff closing spring for reliable closing of the main regulator seat disc under working conditions involving low temperatures, sticky oil, wax, and dirt.

For instance, if the piston area is twice the seat area, which is common in this latter design, then the opening force is the weight of the parts, plus the pressure on the piston multiplied by the difference between piston and seat areas, minus the closing spring force. It is conceivable that for a given required reliable minimum closing spring force, the minimum opening pressure difference required can theoretically be reduced by increasing the piston area; however, this increases the size and cost and weight of the regulator exorbitantly.

Hermetic sealing of the valves and moving parts from the atmosphere also presents problems where piston shaft seats are employed in preventing refrigerant from leaking out or air contaminating the system. This latter essentially precludes external type operating devices whether electric, pneumatic, or hydraulic and places a premium upon the utilization of refrigerant pressures alone.

One possible source of motive power which is totally self-contained to the refrigeration system and powerful enough to be adequate is the pressure differential between the high pressure leaving the compressor sometimes referred to as the condensing pressure, and the lower pressure entering the compressor sometimes referred to as the suction pressure. One main problem involved in using this pressure differential is that it may be so great that excessive leakage from the condensing side to the suction side may occur around a piston in the system or through a bleed hole of the main valve, resulting in partial loss of effective refrigeration capacity of the compressor. Also, the use of this high pressure differential may cause damage to the internal parts of the main regulator, especially when the high pressure results in the main valve slamming to open position.

One way to avoid these problems might be to use a pressure reducing valve on the high pressure to bring it down to a reasonable level, high enough to give reliable operation but low enough to prevent excessive leakage and slamming. Unfortunately, such a method would not be practical for most refrigeration systems because the suction pressure is constantly changing due to refrigeration load changes.

For example, in a system running at 40 p.s.i.g. (pounds per square inch gauge) suction pressure, a pressure reducing valve could be used to bring a possible condensing pressure supply of 180 p.s.i.g. down to 50 p.s.i.g. The 10 p.s.i. difference would be acceptable to operate the main regulator. However, if the refrigeration load increased enough to raise the suction pressure to 50 p.s.i.g. or higher, the main regulator would become closed due to lack of operating pressure difference. Furthermore, if the refrigeration load dropped enough to lower the suction pressure possibly to 5 p.s.i.g., the 45 p.s.i.g. operating difference would cause excessive leakage and slamming of the main regulator.

This invention contemplates a controlled operating pressure supply which is always maintained just high enough above suction pressure to provide ideal performance of the main regulator without it ever being too high or too low.

Accordingly, an object of this invention is to provide a refrigeration control system which permits an automatic main regulator in the suction line to operate at less than a two p.s.i. pressure differential between regulator inlet and outlet and as low as zero pressure differential and with the main regulator constructed to an adequately economical size.

Another object of the invention is to permit the use of a relatively heavy valve closing spring to facilitate regulator seat closing despite cold or sticky oil or other foreign material being present.

Another object is to provide an operating force for the main regulator which can be adjusted to overcome different degrees of operational resistance occurring with undesirable foreign elements present within the regulator.

Another object is to provide an upstream pressure regulator which under heavy load conditions will open wide with less than 2 p.s.i.g. pressure drop.

Another object is to provide an outlet pressure regulator which throttles the flow of refrigerant to the compressor suction and prevents overloading yet operates wide open without requiring a main regulator pressure drop when not required to throttle because of high compressor suction pressure.

Another object is to provide an open or closed main valve which requires little or no pressure drop across its valve to remain open.

Another object is to provide a differential pressure regulator which can be opened wide when desired with no pressure differential across its valve.

A further object is to provide an automatic closing valve which can be wide open at no pressure drop for installation in a vertical, horizontal, or skew position refrigeration line, carrying gas or liquid, in gravity recirculating refrigeration evaporators and properly control the flow or pressure of the evaporator relative to its surge drum.

A further object is to enable a main regulator to be provided with a valve actuating piston area the same as the valve seat area and yet operate reliably without requiring pressure drop across the main regulator valve.

Another object of the invention is to provide a refrigerant system in which critically operative elements may be mounted in any gravitational orientation.

Another object of the invention is to provide a signal of evaporator pressure with a constant added small increment of pressure that is within the ability of available equipment to handle, which increment can be adjusted with respect to desired sensitivity and any expected work load conditions in different installations.

The invention is further characterized by the improved operation of comparatively low pressure control valve designs with a superposed pressure applied thereto that is created and controlled to be just enough higher than the suction pressure in a compressor refrigerant system to assure reliable operation at all times and not so high at any time as to cause excessive leakage.

In its preferred form, the invention contemplates taking a high pressure from the condensing side of a refrigeration system and hermetically controlling it at a fixed increment level of approximately 5 p.s.i. above the pressure at the inlet of the main refrigerant flow control valve in a low pressure line and using it to pilot the valve for reliable, accurate operation over a range of pressure differentials across the flow control valve, virtually including zero p.s.i.

A further object of the invention is to control a refrigerant flow control valve in a high pressure line in a system of a controlled low pressure by creating a fixed differential of approximately 5 p.s.i. below the high pressure entering the main refrigerant flow control valve whereby the controlled low pressure serves to sensitize the main valve for reliable, accurate operation over a range of pressure differentials across the flow control valve as low as zero p.s.i.

These being among the objects of the invention other and further objects will be apparent from the description and claims relating to the drawings herein wherever like numerals refer to the parts and in which FIG. 1 is a diagramattic view of one of the embodiments of the invention to control evaporator pressure with the operating elements shown in diagrammatic detail.

FIG. 2 is a diagrammatic view of another embodiment of the invention to control compressor suction pressure.

FIG. 3 is a diagrammatic view of a dual compressor system for low temperature having an intermediate pressure for control motive power.

FIG. 4 is a diagrammatic view of a modification of the embodiment shown in FIG. 3 having two evaporators, one low temperature and one intermediate temperature, using condensing pressure as the control motive power on both levels of evaporation.

FIG. 5 is a diagrammatic view showing the versatility of the invention in the location of the refrigerant flow control regulator in a high pressure line of the refrigeration system.

This invention may use essentially conventional but modified valve designs as part of an inventory and servicing economy. As constructed and arranged, however, it contemplates creating a source of pressure to operate valves which is controlled to be just enough higher than a lower pressure, such as suction pressure, to give reliable operation, but not so high as to involve excessive leakage. This is done preferably by drawing pressure from the condensing or discharge side of a refrigeration system through a control valve or pilot regulator to provide an adjustably set usable pressure having an added fixed increment pressure component. For example, five pounds per square inch could be the pressure component above the pressure present in the line immediately upstream of the main regulator flow control valve. This component compensates for evaporator pressure at as low a level as possible for reliable operation of a refrigerant flow control regulator of moderate pressure design located in the low pressure side of a refrigeration system. Furthermore, in order to assure reliable operation under all installation conditions, a pair of check valves are preferably provided to supply the inlet side of the pilot regulator with either the evaporator pressure or the condensing pressure, whichever is the higher at a start-up time. This would take care of the situation following a shut down period where the condenser is in a cooler place than the evaporator and the evaporator pressure may be, therefore, higher than the condenser pressure.

A counterpart arrangement for a main regulator flow control valve in the high pressure line of a refrigeration system contemplates creating a pressure to operate valves which is controlled to be just enough lower than a higher source pressure, such as the condensing pressure, to give reliable operation, but not so low as to induce excessive leakage. This is done by conducting pressure to the suction side of a refrigeration system through a control valve or pilot regulator which yields an adjustably set pressure having a subtractive fixed decrement pressure component. For example, 5 p.s.i. could be the pressure component below the pressure in the line immediately upstream of the main regulator flow control valve. This component compensates the condensing pressure at as high a level as possible for reliable operation of a refrigerant flow control regulator located in the high pressure side of a refrigeration system.

Here again, in order to assure reliable operation under all installation conditions, a pair of check valves are preferably provided to provide the outlet side of the pilot regulator with either the suction pressure or the condensing pressure. In this instance, however, they supply whichever pressure is lower at start-up time. This would take care of the situation following a shut down period where the condenser is in a cooler place than the evaporator and the condensing pressure may therefore be below the suction pressure.

Conventional auxiliary equipment such as strainers, traps, sight glasses, hand shut-off valves, fuse plugs, relief valves and particular constructions of evaporators are omitted for purposes of clarity of disclosure. Furthermore, by way of example and not of limitation but for better comprehension of the description of the invention, gauge pressures are shown in the drawings in script numerals followed by the suffix $p$ at significant points in the systems as typical for the common refrigerant known as "R–12" with the systems set for a 5 p.s.i. differential increment.

Referring now to the drawings in further detail, FIG. 1 shows an evaporator pressure regulated refrigeration system having the usual compressor 10, with intake 11 and outlet 12, condenser-receiver 13, with inlet 14 and outlet 15, expansion valve 16 with inlet 17 and outlet 18, and evaporator 19, connected in series with one another and with a hermetic pressure regulator valve 20 located between the evaporator 19 and the intake 11 of the compressor 10.

The expansion valve 16 operates automatically. The compressor 10 and condenser-receiver 13 are of commercial design and, along with particular valve port areas, are selected in size with respect to the work load that is to be performed by the evaporator 19. Most of the parts are interchangeable throughout the several views as indicated by like numbers referring to like elements and for purposes of description it is assumed that the compressor 10 has supplied adequate refrigerant to the condenser-receiver 13 at its inlet 14 for refrigerant to be present there in its liquid phase.

The expansion valve 16, having an inlet 17 connected to the condenser 13, modulates the flow of liquid refrigerant from the condenser outlet 15 and expands it from a liquid at condenser pressure to a liquid and vapor mixture and delivers it from its outlet 18 to the evaporator 19 at evaporator pressure. The expansion valve 16 may be of any one of several conventional designs wherein the valve flow is controlled by superheat of the gas leaving the evaporator (thermostatic expansion valve), by liquid level in the evaporator (low side flat valve) or by liquid level at the valve inlet (high side float).

The refrigerant flow and pressure regulator control valve 20 connected to the outlet of the evaporator 19 modulates the flow of vaporized refrigerant from the evaporator in relation to the work load of the evaporator in a refrigeration system controlled generally by a thermostat means (not shown) and endeavors thereby to control evaporation and heat absorption in the evaporator. As the pressure in the evaporator increases, the flow control valve 20 gradually opens. The construction preferably is one in which a valve body 28 has a passage 30 therethrough defining a valve port 31 and a valve member 32 co-operating with the valve port 31 to graduate the flow of refrigerant. The valve member 32 is urged to close in the direction of flow by a valve closing spring 34. A piston 35 located in the body has its inner side exposed to the downstream pressure of the valve and if linked to the valve member assists in closing the valve as the downstream pressure increases. The outer side of the piston is hermetically sealed but in accordance with the teachings of the invention is exposed to refrigerant pressure to urge the opening of the valve. A bleed orifice 36 through the piston head prevents lockups.

In usual systems, the pressure to which a piston, such as piston 35, is exposed is merely the inlet pressure of the valve. This, however, renders the back pressure control operation of the flow regulator unreliable where a differential pressure of less than 2 p.s.i. exists. Under this low pressure, no matter how a pilot regulator or valve is opened, the up-stream pressure is inadequate to counter a valve closing spring 34 that is strong enough to effectively close the valve member 32.

In the present invention, rather than reduce the strength of a valve closing spring at 34 and have unreliable valve operation, it has been found that the valve can remain hermetic and operate with greatly improved reliability by applying the evaporator pressure with approximately 5 p.s.i. added thereto. In doing this the outlet pressure at the outlet 12 of the compressor 10, as related to the condenser pressure, is conducted to the inlet 37 of and through a downstream pressure regulator 38 which reduces that pressure to a 5 p.s.i. component above the evaporator pressure that exists at the inlet 20i of the flow control valve 20. This provides a working pressure for the piston 35 that follows the evaporator pressure up and down 5 p.s.i. above it.

The regulator 38 comprises a valve body 39 having a passage 40 therethrough defining a valve port 41 facing the inlet 37 thereof and a diaphragm 42 on the outlet side 43 thereof as held in sealed relationship by a bonnet 44. A valve element 45 closes in the direction of flow as urged by a back cap spring 46 and the outlet pressure below the diaphragm 42. The valve opens against the flow of refrigerant as urbed by the combined efforts of an adequate pressure above the diaphragm 42 that is supplied thereto from the evaporator 19 through connection 51, and the tension adjustably imposed upon the bonnet spring 47 by the threaded bonnet stem 48. The bonnet is sealed from the atmosphere by sealing cap 50.

In providing these combined efforts, the stem 48 is adjusted in connection with two gauges, one gauge 52 in the evaporator line 53, and the other gauge 54 in the outlet line 55 of the regulator 38. The stem 48 is adjusted to provide a pressure reading difference between the gauges in the range of 2 to 10 p.s.i., preferably just about 5 p.s.i., and it will be noted that this difference remains substantially constant regardless of variations in the evaporator pressure in the bonnet 44. For instance, with an evaporator pressure of 20 p.s.i., the outlet pressure at gauge 54 of regulator 38 will be 25 p.s.i. Or, with the evaporator pressure of 1 p.s.i., the outlet pressure at gauge 54 is 6 p.s.i.

This 5 p.s.i., as compensated by the evaporator pressure increment, is significant because in adapting the refrigerating system to varying conditions and different refrigerants, the outlet pressure of regulator 38 can be further controlled by a valve such as by an evaporator pilot pressure regulator 56, the evaporator pressure increment and the 5 p.s.i. being proportionately reduced for the best operating efficiency of the refrigerant flow regulator 20. In fact, the 5 p.s.i. portion can be varied for optimum ultimate piloting pressure.

The regulator 56 is essentially a small upstream pressure regulator with a body 57 having a passage 58 defining a valve outlet port 60 closed by a diaphragm 61 that is urged to its closed position by a bonnet spring 62 adjusted by a threaded bonnet stem 63 hermetically sealed by a sealing cap 64. The inlet pressure of the regulator is initially effective over the major portion of the diaphragm area and when high enough, lifts the diaphragm against the spring 62 and opens the valve port 60 for the flow of refrigerant under controlled pressure. The tension imposed on the spring 62 determines the upstream pressure at which flow begins. The amount by which the upstream pressure exceeds the setting of spring 62 determines the lift of diaphragm 61 from port 60, thereby establishing flow to the top of the valve piston 35, which determines the opening of the flow control valve 20.

Preferably the setting of the pilot regulator 56 is just above the added pressure of 5 p.s.i. and therefore whenever any pressure is present in the evaporator to serve as a working pressure, no matter how low, the pilot regulator 56 will open and supply the main regulator 20 with adequate pressure to overcome the spring 34 therein, and to the extent that the pressure exceeds initial tension of spring 34, the main regulator 20 will be opened increasingly for greater flow. A bleed orifice 36 in the piston 35 of the main regulator 20 prevents any lock up of pressure between the pilot regulator 56 and the regulator 20 that might keep the regulator 20 open. Then when the pilot valve 56 closes and the pressure is bled down, the strong spring 34 in the regulator 20 assures full closure of the valve member 32 to prevent leakage from the evaporator 19 to the compressor 10.

Explained another way, the pilot regulator 56 is set at 5 p.s.i. above desired evaporator pressure and the pressure at gauge 54 is always maintained at 5 p.s.i. above actual evaporator pressure. If actual evaporator pressure rises by 1 p.s.i., then the pressure at gauge 54 rises by 1 p.s.i., and the pilot regulator 56 is exposed to pressure 1 p.s.i. above its setting. Consequently, pilot regulator 56 opens, resulting in the opening of main regulator 20, which remains open until the evaporator pressure returns downwardly to its desired level, namely 5 p.s.i. below the setting of pilot regulator 56.

It will be appreciated that upon occasion in some systems during a shut down period, the pressure in the condenser-receiver 13 can fall below the pressure in the evaporator 19, as where the condenser-receiver 13 may be outside in winter weather. This could prevent operation of the pilot regulator valve 56 from supplying a pressure high enough to open the flow regulator 20. Accordingly, two conventional small and lightly operated check valves 66 and 67 are provided, one check valve 66 between the outlet 12 of the compressor 10 and the inlet 37 of the regulator 38 to prevent back flow to the compressor. The other check valve 67 is disposed between the evaporator 19 and the inlet 37 of the regulator 38 to supply a pressure flow through the regulator. Both open in the direction of flow of refrigerant under pressure to the inlet 37, whichever is higher opens and the other remains closed to block flow in any direction except to the inlet 37.

With the pressure higher in the evaporator, check valve 67 will open and check valve 66 will be closed, thus deploying evaporator refrigerant to the regulator 38 permitting the regulator to open for start-up operation, whereupon compressor operation returns the pressures to those initially described for controlled operation, in which the condensing pressure which is decidedly higher than evaporator pressure. Thus, with the valve member 32 of regulator 20 reliably closed and the expansion valve 16 closed by an increasing pressure in the evaporator under a warm up condition a pressure adequate to return the system to full operation will be provided under all conditions with the check valves being present. This is true even though during this start-up period there will exist a greater pressure drop across the main regulator than that attainable when the condensing pressure exceeds evaporator pressure by at least 5 p.s.i.

It is noted that a solenoid shut-off valve 68 can be provided in the connection from the compressor output 12 to the regulator 38. When energized, the electrical coil 70 of the solenoid valve lifts the valve armature 72 and tapered seat 73 opens thereby permitting regulator 38 to receive its supply of condensing pressure. When solenoid valve 68 is de-energized and thereby closes, regulator 38 is no longer able to convey pressure to pilot regulator 56, which then is also closed. Pressure on top at piston 35 escapes through bleed hole 36, permitting spring 34 to close the main flow control valve 20.

It will be appreciated that in commercial production, many of these valve components shown separately can be made as composite units as where the pilot valve 56 and regulator 38 can be mounted directly on the main flow control or regulator 20 and the connections among them be suitable passages through the body parts. They are shown separately as a matter of convenience in understanding their operation and co-action.

Furthermore, the pilot valve 56 can be omitted in the embodiment shown in FIG. 1 if a solenoid valve 68 is located in the actuating pressure line 55 to control the application of the actuating pressure to the main regulator 20 with an electrical temperature or pressure responsive circuit.

In FIG. 2 a pressure regulation system is shown embodying the invention wherein the pressure that is entering the compressor 10 is controlled against excess as where it is desirable to keep from overloading the compressor where a warm evaporation period or a hot gas defrost period is likely to occur. In providing this, an orifice 74 is located in the actuating pressure line which is approximately three times the flow capacity of the bleed orifice 36 in the main regulator piston 35 and the pilot pressure regulator 56 has its inlet 56i connected to the compression suction intake 11 and its outlet 56o connected to both the piston 35 in the main regulator 20 and to the orifice 74. During normal running, the valve 56 remains closed and the pressure supplied by pilot regulator 38 is effective through orifice 74 to drive the piston 35 to open the flow control valve 20. Then when the pressure at the compressor intake exceeds a certain level, the regulator 56 opens and permits high pressure effective on the piston 35 to flow towards the intake 11 and be depleted.

More particularly, the compensated pressure supplied by the regulator 38 reaches the main regulator 20 through the orifice 74 and it being larger than the bleed orifice 36 in the main regulator piston, the pressure is effective to actuate the piston 35 to open the valve 20 for evaporated refrigerant to flow to the compressor intake. The lower the compressor intake pressure is, the larger will be the flow control valve opening.

If the compressor is not running or the evaporation period has been quite warm, and the pressure at the compressor intake is above an undesirable level, this pressure being also effective through inlet 56i against the bottom of the diaphragm 61 in the pilot pressure control valve 56, it will exceed the setting of the bonnet spring 62 and the valve port 60 is opened with the result that pressure in the pilot line downstream of the orifice 74 is lowered by flow to the compressor intake. The regulator 38 loses downstream pressure through control valve 56 and is forced to throttle the flow from the compressor output, thereby further lowering the pressure above the piston 35. This lowering of the effective piloting pressure applied to the flow regulator piston 35 correspondingly affects the flow valve 32 position and modulates the refrigerant flow therethrough to keep the intake pressure below the undesirable level. This undesirable pressure level is adjusted for by adjustment of the pilot pressure regulator 56 and is made in relation to the maximum capacity of the compressor as rated in pounds per square inch for the particular refrigerant being used.

FIG. 3 is an illustration of a two stage system of the character defined embodying the invention in which an intercooler 75 is employed which operates at an intermediate pressure in addition to the high pressure in the system. Either pressure can be used to feed the regulator 38 and the pilot valve 56 furnishing the piloting pressure to the flow control valve 20. Two compressors are shown and although one or more evaporators can be used for different temperatures as shown in FIG. 4, only one evaporator 19 is shown in FIG. 3 for a low temperature work load as fed with liquid refrigerant 76 from the intercooler 75 through expansion valve 16. The liquid 76 is maintained at a predetermined level by a float control 77 supplied with liquid from the high pressure condenser 13 which liquid is derived by compressing vapor received from the intercooler, condensing it and returning it to the intercooler.

The refrigerant vaporized in the low temperature evaporator 19 is conveyed to the intake of the low pressure compressor 10a, through a flow control valve 20 and when compressed is bubbled up through the liquid 76 in the intercooler 75 to chill the liquid 76 and then be further compressed in the compressor 10, as already described.

Although the compensated pressure for the pilot regulator could be taken from the output of the compressor 10 as at connection X (FIG. 4) or, X could serve as a single pressure source for compensating a series of pressures for flow control valves, it is shown as connected to the output of the compressor 10a to illustrate the usefulness and adequacy of an intermediate pressure for purposes of the invention.

In FIG. 4 the embodiment shown in FIG. 1 is combined with the embodiment shown in FIG. 3 except for the absence of the pilot regulator 56 in both stages to represent the embodiment that either one or both stages can be operated with a solenoid valve 68 or a thermal responsive valve means 78. Furthermore, it is shown that a single source of higher refrigerant pressure can be used for actuation of several flow control valves 20 as compensated by evaporator pressures in the several stages.

FIG. 5 illustrates the modification of FIG. 1 in which the flow control valve 80 may be located in any portion of the system which is at condensing pressure, either where it is shown at 80 as between the compressor discharge 12 and condenser inlet 14, or at 80a between the condenser exit 15 and the entrance 14a to a liquid receiver vessel 13a, or at 80c between the liquid receiver outlet 15a in the high pressure liquid line 81 ahead of the expansion valve 16, or at 80b. This arrangement upon occasion is desirable when the condensing pressure level must be controlled due to very low temperature of condensing medium causing abnormally low condensing pressure, or it is desirable to raise temperature of condensing medium for some heating purpose, or it is desirable to raise the pressure of the liquid in the receiver. FIG. 5 shows a system incorporating an air cooled or evaporative cooled condenser 82 having separate receiver 13a for high pressure liquid storage.

In order to operate the flow control valve 80 without requiring pressure drop, it is necessary to again use as motive power the difference between condensing pressure and suction pressure. Since the valve is at condensing pressure, a lower pressure is needed to operate the valve. In this case, to avoid the possible excess leakage and damage which might result from using the full difference between condensing pressure and suction pressure, a control pressure sink regulator 83 is used to create a control pressure sink at its inlet 84, shown on gauge 85, which is maintained at about 2 to 10 p.s.i. below the pressure at the exit 94 of the flow control valve 80.

To accomplish this, the control pressure sink regulator 83 is located with its inlet 84 connected via one or more pilot regulators or solenoid valves to operating chamber 101 above piston 97 in the flow control valve 80. Conduit 102 conducts pressure from the inlet 98 of the flow control valve to act on the diaphragm 87, that acts to open seat plug 91 from orifice 90, permitting flow from entrance 84 to exit 86. Fixed spring 88 serves to keep diaphragm 87 in position. Spring 89 as adjusted by screw 92 hermetically sealed by cap 93 can vary the amount by which pressure in entrance 84 must be less than the pressure in conduit 102 for port orifice 90 to be opened and thereby regulates the pressure at entrance 84. Thus a controlled sink pressure is maintained at entrance 84 which is always as set for, usually about 5 p.s.i. below compressor discharge pressure.

Assuming that pilot solenoid valve 68 is open, pilot valve 56 operates to open when pressure at its outlet 56i in this case, exceeds its setting. Upon opening the seat port 60 in pilot valve 56, preferably being at least three times as large as piston orifice 96, causes pressure in chamber 101 to be reduced to almost the pressure present at entrance 84. This pressure, being about 5 p.s.i., or lower than the pressure present at inlet 98, and effective below main port 99, causes piston 97 to compress spring 95 and open the main port 99 in a modulating fashion proportional to the opening of pilot valve 56.

Pilot valve 56 can be omitted in the embodiment shown in FIG. 5 if solenoid valve 68 is located in the actuating pressure line 103 where shown to control the escape of pressure from the flow control valve chamber 80 as controlled by an electrical temperature or pressure responsive circuit.

Furthermore, both the pilot valve 56 and solenoid valve 68 can be omitted in favor of the use of a temperature responsive valve 78 of FIG. 4 of any well known variety. Solenoid valve 68 can be omitted in any application for which additional on-off electrical control of the flow control valve is not necessary.

In FIG. 5, 80b indicates another position for a flow control valve constructed identical to 80 as located in a conduit by-passing the condenser 82 by being connected directly from compressor discharge 12 to an entrance 14a to receiver 13a. A flow control valve at 80b may be used alone or in combination with the flow control valve 80 and this is true of control valves 80 at 80a and 80c. Flow control valves 80c and 80a and 80b and 80 may all be used independently or in combination with one or more of each other depending upon the control and cost objectives of the system. Flow control valves at 80a, 80b, and 80c would be operated by the identical pilot control circuit between conduit 103 and 104 shown for flow control valve 80.

Because of the availability of approximately 5 p.s.i. pressure difference for operation, spring 95 may be constructed sufficiently stiff to overcome grit and sticky oil conditions. Also, piston 97 diameter can be made to be the same as orifice diameter 99. Leakage through orifice 94 and through a .001" to .003" diametral clearance for the piston 97 is not excessive because the leak causing pressure difference is limited to 5 p.s.i. or a similar value as determined by adjusting screw 92.

Having thus described several embodiments of the invention, their arrangement and operation and how adjustments can be made of pressures to meet various contingencies, it will be appreciated by those skilled in the art how the objects, results and advantages described herein are attained and how various and further adjustments and relationships can be provided within the teachings of the invention, the scope of which is commensurate with the appended claims.

What is claimed is:

1. In a refrigeration system having serially connected condenser, expansion valve and evaporator, and serially connected therewith a refrigerant flow control valve, and a compressor providing high and low refrigerant pressures, said flow control valve, a pressure responsive element for opening said valve and having a bleed orifice by-passing said pressure responsive element, a compensating regulator means including a valve member, resilient means urging the valve member to its open position and a member responsive to refrigerant pressure upon one side thereof for urging the valve member to its open position and upon its other side to refrigerant pressure for urging closure of the valve member, said other side of the pressure responsive member being in communication with one side of the valve member, means connecting one of said high and low pressures to the upstream side of the flow control valve, and to said one side of said pressure responsive member to urge opening of the valve member, means connecting the other one of said high and low pressures to the other side of the valve member, said resilient means urging said valve member to its open position to impose a predetermined pressure differential between pressures on opposite sides of the valve member, and means connecting said one side of the valve member to said pressure responsive element and through said bleed orifice to the downstream side of said flow control valve.

2. The combination called for in claim 1 in which the last mentioned connecting means includes a pilot regulator for lowering the pressure a predetermined amount upon the refrigerant flowing therethrough.

3. The combination called for in claim 1 in which said means connecting said one side of said pressure responsive member to one of said high and low pressures includes a back flow check valve opening in the direction of refrigerant flow therethrough, and back flow check valve means connecting said one side of said pressure responsive member to the other of said high and low pressures to open when the first mentioned back flow check valve closes.

4. The combination called for in claim 1 in which the last mentioned connecting means includes a solenoid refrigerant flow cut-off valve whereby pressures on opposite sides of said pressure responsive element equalize through said bleed orifice for the flow control valve to assume its normally closed position.

5. In a refrigeration system having a refrigerant compressor, a condenser, an expansion valve and an evaporator connected in series,
   a refrigerant flow control apparatus serially connected between the outlet of the evaporator and the intake of the condenser comprising
   a refrigerant vapor flow control valve means, and
   a refrigerant compressor connected together in series, therewith
   said flow control valve means having a first pressure responsive member for actuating the valve element thereof,
   a downstream pressure regulator means interconnecting the outlet of the compressor and said pressure responsive member and including a valve member and
   a second pressure responsive member for actuating the valve member to apply pressure to said first pressure responsive member and actuate said valve element,
   means connecting the second pressure responsive member to the outlet of the evaporator for applying the pressure present at said outlet to said second pressure responsive member to urge the valve member of the pressure regulator means to open, and
   resilient means assisting said inlet pressure to open the valve at a predetermined pressure differential above the pressure present at said outlet of said flow control valve means.

6. The combination called for in claim 5 in which said flow control valve means in its serial connection is connected between the outlet of said compressor and the inlet of said condenser.

7. The combination called for in claim 5 including a flow control valve connected in series with said downstream pressure regulator between the outlet of said compressor and said first pressure responsive member.

8. In a refrigeration system having serially connected condenser, expansion valve and evaporator, and serially connected therewith a refrigerant flow control regulator and a compressor providing high and low refrigerant pressures,
   said flow control regulator including a normally closed flow control valve, a pressure responsive element for opening said valve,
   a compensating regulator means including a valve member, resilient means urging the valve member to its open position and a member responsive to refrigerant pressure upon one side thereof for urging the valve member to its open position and upon its other side to refrigerant pressure for urging closure of the valve member,
   said other side of the pressure responsive member being in communication with one side of the valve member,
   means connecting the evaporator low pressure to the upstream side of the flow control valve, and to said one side of said pressure responsive member to urge opening of the valve member,
   means connecting the compressor high pressure to the other side of the valve member,
   said resilient means urging said valve member to its open position to impose a predetermined pressure differential between pressures on opposite sides of the valve member, and
   pilot regulator means interconnecting the pressure responsive elements and the downstream side of the flow control valve for conducting refrigerant vapor from the pressure responsive element to the downstream side above a predetermined pressure above said downstream pressure,
   means connecting said one side of the valve member to said pressure responsive element.

9. The combination called for in claim 8 in which the last mentioned connecting means includes a flow restricting orifice.

10. In a refrigeration system having a refrigerant compressor, a refrigerant condenser, expansion valve and evaporator connected together in series, the combination of a
    pressure actuated flow control valve means connected between the outlet of the evaporator and the intake of the compressor and having a normally closed valve element and a pressure responsive reciprocable member for moving the valve element to its open position,
    a compensating regulator means interconnecting the outlet of the compressor and said reciprocable member for applying pressure to said reciprocable member to open said valve element and including a second valve element and a pressure responsive reciprocable member for actuating it,
    means connecting the second reciprocable member with the inlet of said flow control valve means for applying the pressure at said inlet to said second reciprocable member to urge the second valve to open, and
    resilient means assisting said second reciprocable member to open the valve at a pressure above the pressure at the inlet of said flow control valve.

11. In a refrigeration system having a refrigerant compressor, condenser and intercooler connected in series and a second refrigerant compressor, expansion valve and evaporator connected in series with the intercooler with the intercooler connected between the second compressor and the evaporator, the combination of a
    pressure actuated flow control valve connected between the evaporator and the intake of the second compressor and having a pressure responsive reciprocable member for actuating the valve element thereof,
    a downstream pressure regulator interconnecting the outlet of one of the compressors and said reciprocable member to apply pressure to said reciprocable member to actuate said valve and including a second pressure responsive reciprocable member,
    means connecting the second reciprocable member with the inlet of said flow control valve for applying said inlet pressure to said second reciprocable member, and
    resilient means assisting said second reciprocable member to open the valve at a pressure above the pressure at the inlet of said flow control valve.

12. The combination called for in claim 11 in which said connection of the downstream pressure regulator is to the outlet of the second compressor to provide an intermediate pressure.

References Cited by the Examiner
UNITED STATES PATENTS
3,242,688   3/1966   Miller _____ 62—217

MEYER PERLIN, *Primary Examiner.*